(12) United States Patent
Gailloux et al.

(10) Patent No.: US 7,729,948 B1
(45) Date of Patent: Jun. 1, 2010

(54) SYSTEMS AND METHODS FOR ENABLING CUSTOMER CARE ASSISTANCE WITH SELF-SERVICE TRANSACTIONS

(75) Inventors: Michael A. Gailloux, Overland Park, KS (US); Robert E. Urbanek, Belton, MO (US); Devon L. Biere, Olathe, KS (US); Sanjay K. Sharma, Olathe, KS (US); Robin D. Katzer, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 476 days.

(21) Appl. No.: 11/388,673

(22) Filed: Mar. 24, 2006

(51) Int. Cl.
*G06Q 30/00* (2006.01)
(52) U.S. Cl. .................. 705/26; 455/424; 455/418; 455/422.1; 455/406; 455/414.1; 719/315; 709/205; 709/227
(58) Field of Classification Search .............. 705/28; 455/411, 419, 414.4, 405, 418, 422.1, 424; 704/275; 709/220, 223; 405/422.1, 418, 405/424; 719/315; 186/35; 370/328, 338, 370/265.01
See application file for complete search history.

(56) References Cited

U.S. PATENT DOCUMENTS

| | | | | |
|---|---|---|---|---|
| 5,956,636 | A * | 9/1999 | Lipsit | 455/411 |
| 5,983,369 | A * | 11/1999 | Bakoglu et al. | 714/46 |
| 6,014,647 | A * | 1/2000 | Nizzari et al. | 705/39 |
| 6,230,197 | B1 * | 5/2001 | Beck et al. | 709/223 |
| 6,587,684 | B1 * | 7/2003 | Hsu et al. | 455/419 |
| 6,978,307 | B2 * | 12/2005 | Goldstein | 709/227 |
| 7,047,296 | B1 * | 5/2006 | Safstrom et al. | 709/224 |
| 7,424,718 | B2 * | 9/2008 | Dutton | 719/318 |
| 7,539,484 | B2 * | 5/2009 | Roundtree | 455/414.1 |
| 2002/0111811 | A1 * | 8/2002 | Bares et al. | 704/275 |
| 2002/0169864 | A1 * | 11/2002 | Sesek | 709/223 |
| 2003/0013434 | A1 * | 1/2003 | Rosenberg et al. | 455/414 |

(Continued)

FOREIGN PATENT DOCUMENTS

WO WO98/38823 A2 * 9/1998

(Continued)

OTHER PUBLICATIONS

"Siebel Systems Chooses SupportSoft for its Mobile Support Solution." PR Newswire Jun. 24, 2002 Business Dateline, ProQuest. Web. Jan. 5, 2010.*

(Continued)

*Primary Examiner*—Matthew S Gart
*Assistant Examiner*—Olusegun Goyea

(57) ABSTRACT

Upon a client encountering an error while operating a self-service application for changing services in a wireless device, the client can queue themselves to speak with a customer care center representative. Data collected from the client through the self-service application is transferred to a customer care system to provide the customer care representative with application state information including which step in the application the customer requires assistance with. Upon the customer care representative successfully assisting the customer the wireless device continues on to the next step in the self-service application. When all of the steps in the self-service application are complete or upon completion of each step, the data collected is transferred to the customer care system and used to update the necessary systems to implement the change in service.

16 Claims, 10 Drawing Sheets

U.S. PATENT DOCUMENTS

| | | | |
|---|---|---|---|
| 2004/0210450 A1* | 10/2004 | Atencio et al. | 705/1 |
| 2005/0075115 A1* | 4/2005 | Corneille et al. | 455/456.3 |
| 2006/0150119 A1* | 7/2006 | Chesnais et al. | 715/810 |
| 2006/0217111 A1* | 9/2006 | Marolia et al. | 455/418 |
| 2006/0217113 A1* | 9/2006 | Rao et al. | 455/422.1 |
| 2006/0236325 A1* | 10/2006 | Rao et al. | 719/315 |
| 2007/0061468 A1* | 3/2007 | Kelly et al. | 709/227 |

FOREIGN PATENT DOCUMENTS

| | | | |
|---|---|---|---|
| WO | WO0140963 A1 * | 6/2001 | |
| WO | WO2005/036907 A1 * | 4/2005 | |

OTHER PUBLICATIONS

"Blue Martini Software Unveils First Comprehensive Retail CRM Solution." PR Newswire Mar. 4, 2002 Business Dateline, ProQuest. Web. Jan. 5, 2010.*

Patent application entitled "Device Driven System for Activating a Wireless Device," filed Dec. 22, 2005, as U.S. Appl. No. 11/316,288.

* cited by examiner

SYSTEMS AND METHODS FOR ENABLING CUSTOMER CARE ASSISTANCE WITH SELF-SERVICE TRANSACTIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

In order to implement a change in service for a wireless device a client must currently call a customer care center, visit a retail store, or implement basic changes through a website. Examples of changes in service that occur with wireless devices include activation and plan maintenance of the wireless device.

When calling a customer care center for performing plan maintenance the client is typically asked to input a variety of personal data through an interactive voice response system and thereby attempt to describe the problem to an automated system so as to enable routing the call to the correct department. The client then has to wait on hold until a representative can help them. While waiting on hold the client is using resources of the customer care center and thus adding to the cost of operations for a customer care center. Upon being connected with a customer care representative the client must again provide their personal information to verify they have proper authorization to change the account. After providing their personal information again, they must also recount the problem they are having to the customer care representative. The process of the client providing the same information multiple times is frustrating for the client and inefficient and costly to the customer care center.

Similarly, when calling a customer care center to activate a wireless device a client must also wait on hold until a representative can help them. Once connected with the customer care representative, the process for activating a wireless device can take around 20 minutes. As such, this lengthy process uses a lot of resources and increases costs to the customer care center.

Having a client go to a retail store to implement activation or plan maintenance of a wireless device is similarly inconvenient for the client and costly to the device provider. The retail store has a lot of overhead costs including lease payments, electricity, as well as needing to hire an employee that duplicates the duties of the customer care center.

Using a website to implement activation or plan maintenance of a wireless device is more convenient and cost effective than the alternative solutions, however, if a client has problems using the website they must either call customer care or visit a retail store to get assistance. Any information entered through the website will usually be lost and the client will have to start from scratch with the customer care representative.

SUMMARY OF THE INVENTION

Disclosed herein is a system that that enables customer care assistance with self service transactions through a self-service application server and a customer care system. The self-service application server is configured to interact with a self-service application on a wireless device to track a current workflow state and to receive work-in-progress data entered by a user of the wireless device. The customer care system is coupled to the self-service application server to obtain the current workflow state and the work-in-progress data when connecting a customer care representative to the user.

Disclosed herein is a system that enables customer care assistance with self service transactions through a wireless device and a customer care system. The wireless device enables a user to perform one or more self-service transactions from a group comprising device activation, plan maintenance, an ESN swap, an MDN swap, or a CSA swap, wherein the wireless device includes a memory that stores a current transaction state and work-in-progress data when a self-service transaction is performed. The customer care system is configured to receive the current transaction state and the work-in-progress data when connecting a customer care representative to the user.

Disclosed herein is a method of providing customer care assistance for self-service transactions on a wireless device. The method comprises receiving a request for customer care assistance with a self-service transaction, obtaining a current workflow state and work-in-progress data stored on the wireless device, and updating the current workflow state and work-in-progress data in response to input from a customer care representative.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
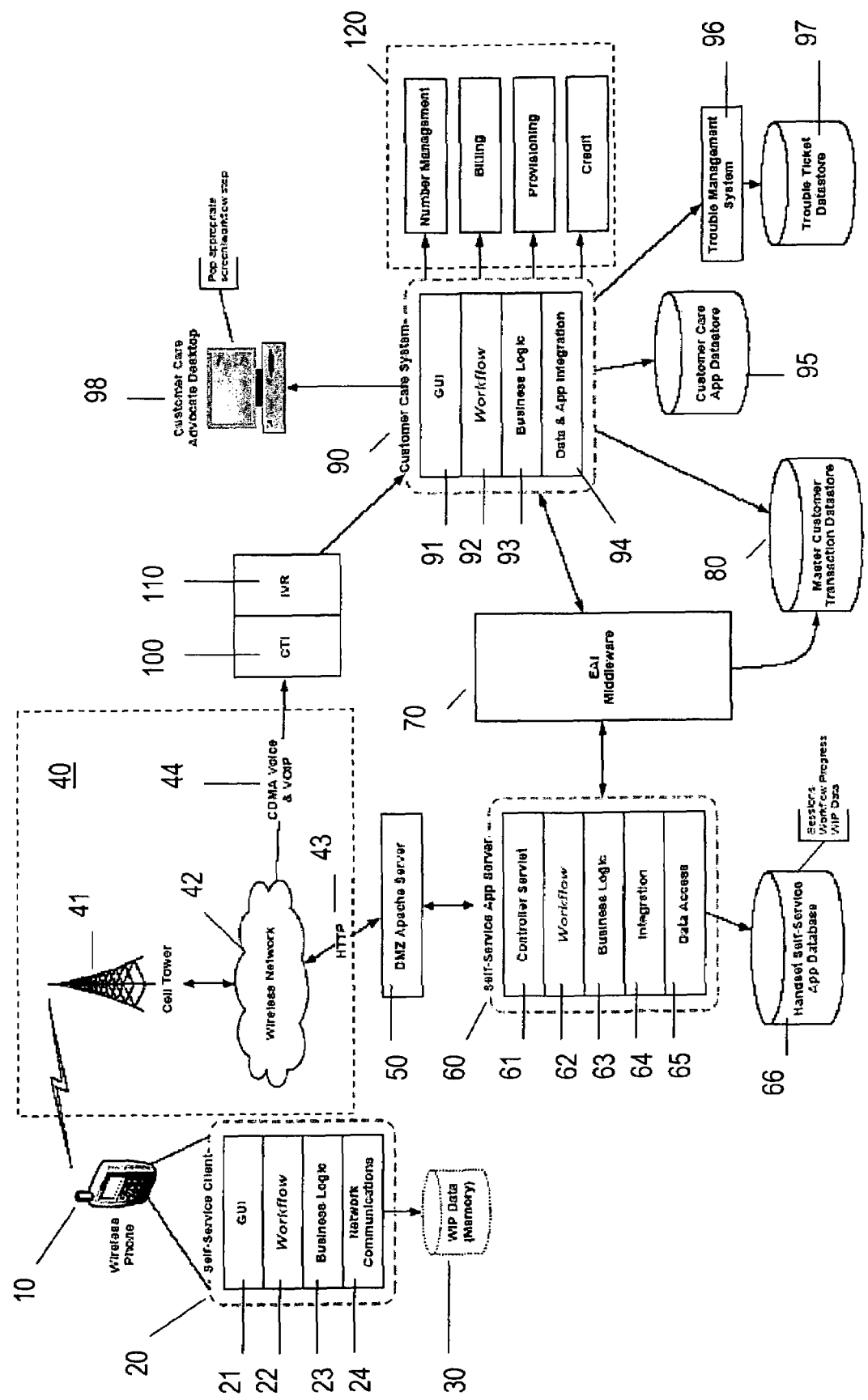
FIG. 1 is an illustrative wireless communications system that enables data exchange between a self-service application on a wireless device and a customer care system.

Disclosed herein are systems and methods for enabling data exchange between a self-service application server and a customer care system. The self-service application server is configured to interact with a self-service application on a wireless device to receive a current workflow state and work-in-progress data entered by a user of the wireless device. The self-service application is configured to implement any current or future activity that can be accomplished by a customer care representative, retail store, or website to change the services provided to the wireless device. If a user of the self-service application encounters an error the customer care system is configured to obtain the current workflow state and the work-in-progress data when connecting a customer care representative to the user. The customer care system then updates the current workflow state and the work-in-progress data in response to inputs from the customer care representative and provides the updated workflow state and updated work-in-progress data to the self-service application server. The self-service application server resumes interacting with the self-service application on the wireless device after receiving the updated workflow state and updated work-in-progress data from the customer care system to resume the self-service application at the updated workflow state. As such, the inconvenient, frustrating, and expensive process of implementing a change in service to a wireless device of the prior art is eliminated through the self-service application and server with the ability to preserve any data and progress made by the user. Further, there is a great reduction of cost to maintaining a customer care system since a customer care representative will only have to assist a client with one or a couple of steps in a workflow and only if the client encounters an error. Thus the amount of time assisting each customer is reduced which in turn reduces wait times for other clients to speak with a customer care representative.

Recently self-service applications have been developed to enable a client to perform a change in service in a wireless device. An example of one such self-service application is in related U.S. patent application Ser. No. 11/316,288 entitled "Device Driven System for Activating a Wireless Device" and filed Dec. 22, 2005 by Gailloux et al., which describes providing self-service activation in a wireless device. The contents of the above described application are herein incorporated by reference in its entirety.

It is noted that while the activation of a wireless device is used as an example above, many other changes in service may be implemented using a self-service application on a wireless device. For example, the three highest volume change in service transactions that occur within telecommunications companies are an electronic serial number (ESN) swap, a mobile directory number (MDN) swap, and a carrier serving area (CSA) swap. An ESN swap is where a client purchases a new phone (which is uniquely identified by an ESN) but wants to carry on their service from their old phone and as such the telecommunications company updates their account to route all of their existing services to the new ESN. An MDN swap is where a client keeps their existing phone but changes their phone number. A CSA swap is where a client moves to a new CSA and keeps their phone but updates their area code and phone number for the new CSA. Each of these changes in service are preferably made possible by a self-service application.

Other self-service change in service transactions can include plan maintenance. Plan maintenance encompasses changing, adding, or deleting any feature available to a wireless device. An example of plan maintenance is where a client tests text messaging on a wireless device for one month and pays $2 a month for 200 messages. At the end of the month the client decides that they like text messaging and want to change their plan to $5 a month for unlimited text messages. Another example of plan maintenance is when using a prepaid wireless device a client may wish to purchase additional minutes for their wireless device. As such, it is envisioned that any current or future activity that can be accomplished by a customer care representative (CCR) or a retail store can be implemented in a self-service application on the wireless device to which it pertains.

Through the implementation of a self-service application to enable a change in service on a wireless device, it is expected that some clients are going to encounter errors. An error may be a device error, software error, customer error, network error, a point of confusion for the customer, or any other problem that a customer might encounter in using the self-service application. Those clients that encounter errors may need to contact a CCR to assist them. As such, it is desirable to be able to transfer any data collected through the self-service application to the CCR so as to avoid having to duplicate steps in the change in service as is a problem with the prior art. Further, upon the CCR successfully assisting the client, it may be desirable to transfer any data collected by the CCR back to the wireless device and enable the wireless device to continue on to the next step in the self-service application.

To that end, FIG. 1 is an illustrative wireless communications system. The system comprises a wireless device 10 which contains a self-service application (SSA) 20. The self-service application 20 comprises a graphical user interface (GUI) component 21 for allowing a client to interface with the wireless device 10, a workflow component 22 for implementing the self-service change in service workflows, a business logic component 23 for implementing basic business rules (e.g., limited data validation), and a network communications component 24 for enabling network communications through the wireless network. The wireless device 10 also comprises a memory 30 for storing work in progress (WIP) data entered by the client at each step of the workflow component 22.

Wireless device 10 communicates through wireless communications means 40. Wireless communications means 40 comprises a wireless communication point 41 such as a cell tower, wireless hotspot, or the like. Wireless communications means 40 further comprises a wireless network 42 which allows data communication through a universal resource locator (URL), or the like in data communication path 43, and voice communication with cellular networks through code division multiple access (CDMA), voice over internet protocol (VOIP), or the like in voice communication path 44.

The data communication path 43 connects to a self-service application server (SSAS) 60 through an isolation server 50. Isolation server 50 may be a demilitarized zone (DMZ) Apache server to provide security and isolation between the internal workings of an enterprise and the outside world.

The SSAS 60 comprises a controller servlet 61 for communication and data flow through the SSAS 60, a workflow component 62 for tracking all of the possible change in service workflows, a business logic component 63 for implementing robust business rules (e.g., complex data validation), an integration component 64 for interacting with the middleware application 70, and a data access component 65 for communicating with the self-service application database (SSAD) 66. The SSAD 66 is used to store data associated with all of the change in service sessions currently occurring, the data including the workflow progress and any WIP data stored on the wireless device memory 30 for each change in service workflow.

The SSAS 60 communicates through a middleware application 70 to a master customer transaction database (MCTD) 80 and a customer care system (CCS) 90. The MCTD 80 is used to store and track all current and completed customer transactions occurring within the CCS 90 and the SSAS 60.

Looking back to the wireless communications means 40, the voice communication path 44 may connect through a computer telephony integration system (CTI) 100 and an interactive voice response system (IVR) 110 to allow routing and connecting calls to the CCS 90. The CTI 100 provides a computer-controlled mechanism to facilitate incoming and outgoing call handling and control, whereas the IVR 110 utilizes a combination of voice prompts and inputs from the client to correctly route the call to the correct department in customer care. For example, a separate department may exist in customer care to handle all calls dealing with self-service application errors. As such the IVR 110 may ask the client if they need assistance with a self-service application, and upon receiving an affirmative from the client the IVR 110 may route the call to the self-service application department in customer care.

The CCS 90 comprises a GUI component 91 for controlling the display of information on a CCR desktop 98, a workflow component 92 for implementing CCR-assisted change in service workflows, a business logic component 93, and a data and application integration component 94 for communicating with the SSAS 60 as well as propagating data to all of the necessary enterprise systems 120. The enterprise systems 120 can include a number management system, a billing system, a provisioning system, a credit verification system, etc. The CCS 90 further comprises a customer care datastore (CCD) 95 for storing data necessary to operate the CCS 90, a trouble management system (TMS) 96 for generating and tracking trouble tickets and routing pending trouble tickets to available system technicians in order of priority. The TMS 96 also communicates with the trouble ticket datastore (TTD) 97 which stores all pending trouble tickets as well as maintains an archive of all closed trouble tickets.

Some embodiments of a process for enabling customer care assistance with self-service applications on wireless device 10 are illustrated in FIGS. 2A-2E.

Figure 2A:
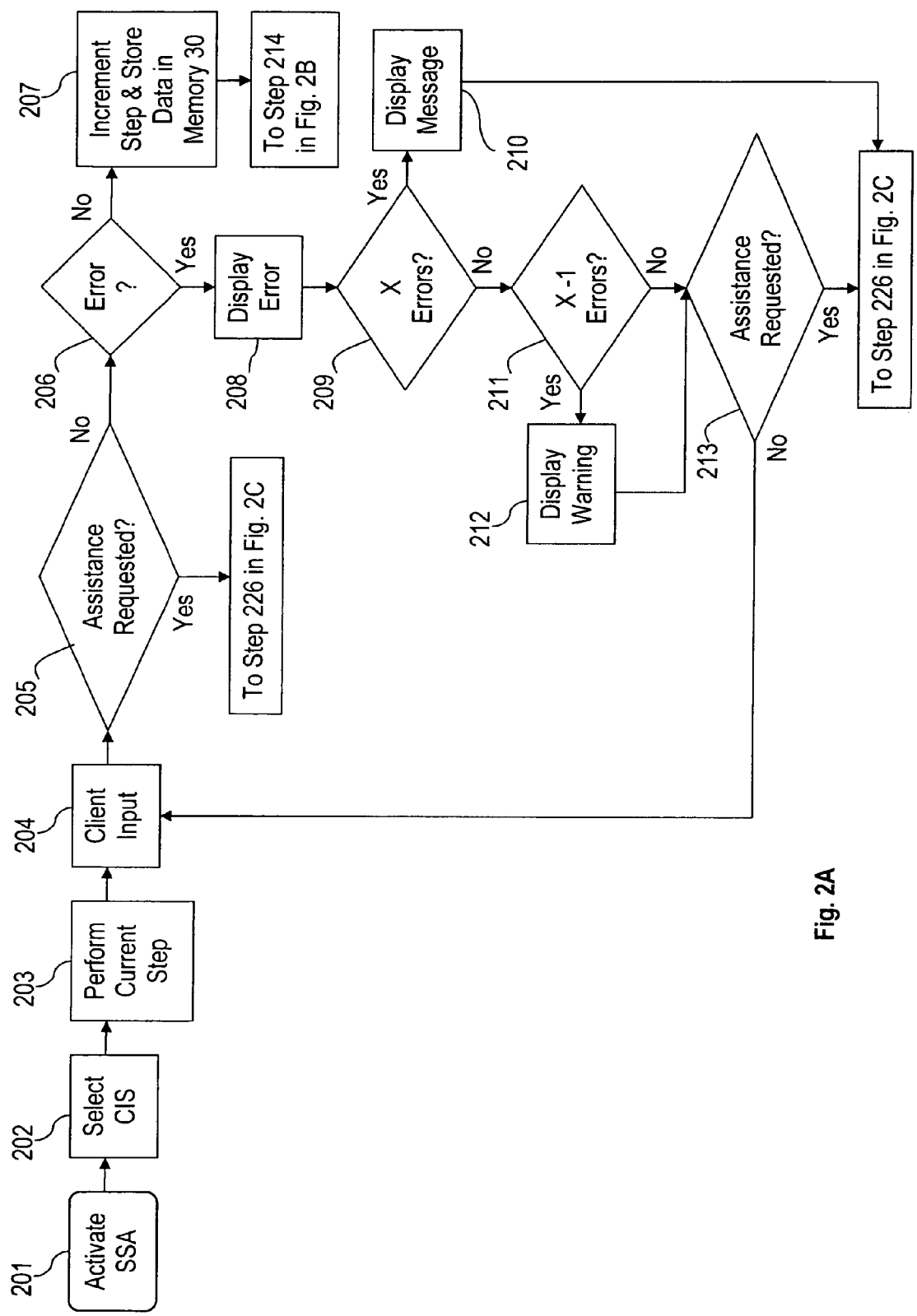
FIG. 2A is an illustrative example of a process for initiating a self-service change in service workflow and implementing basic error detection.

FIG. 2A starts on step 201 with the client activating the SSA 20 on the wireless device 10. The client then selects the type of change in service (CIS) which the client desires and the workflow for that CIS is initialized in step 202. In step 203, the SSA 20 performs the current step in the CIS workflow and receives any input from the client in step 204. In step 205 it is determined if the client has requested assistance from a CCR. This may be accomplished through detecting if the client has pressed a certain key or combination of keys in step 204. If the client does request assistance then the process jumps ahead to step 226 in FIG. 2C, otherwise the process continues on to step 206. In step 206 basic error detection can be implemented through examining the format of the data entered. For example, a client may be entering in an address and only enter in four numbers for the zip code, where the format for a zip code is to always have five numbers. As such, in the above example an error would be detected. It is noted that other basic error detection may be performed here other than just examining the format of the data. If no error is detected in step 206 then the process moves on to step 207 where the workflow step is incremented and the workflow step and any verified data entered in by the client is stored in memory 30 as work-in-progress (WIP) data. The process then continues on to step 214 in FIG. 2B.

Figure 2B:
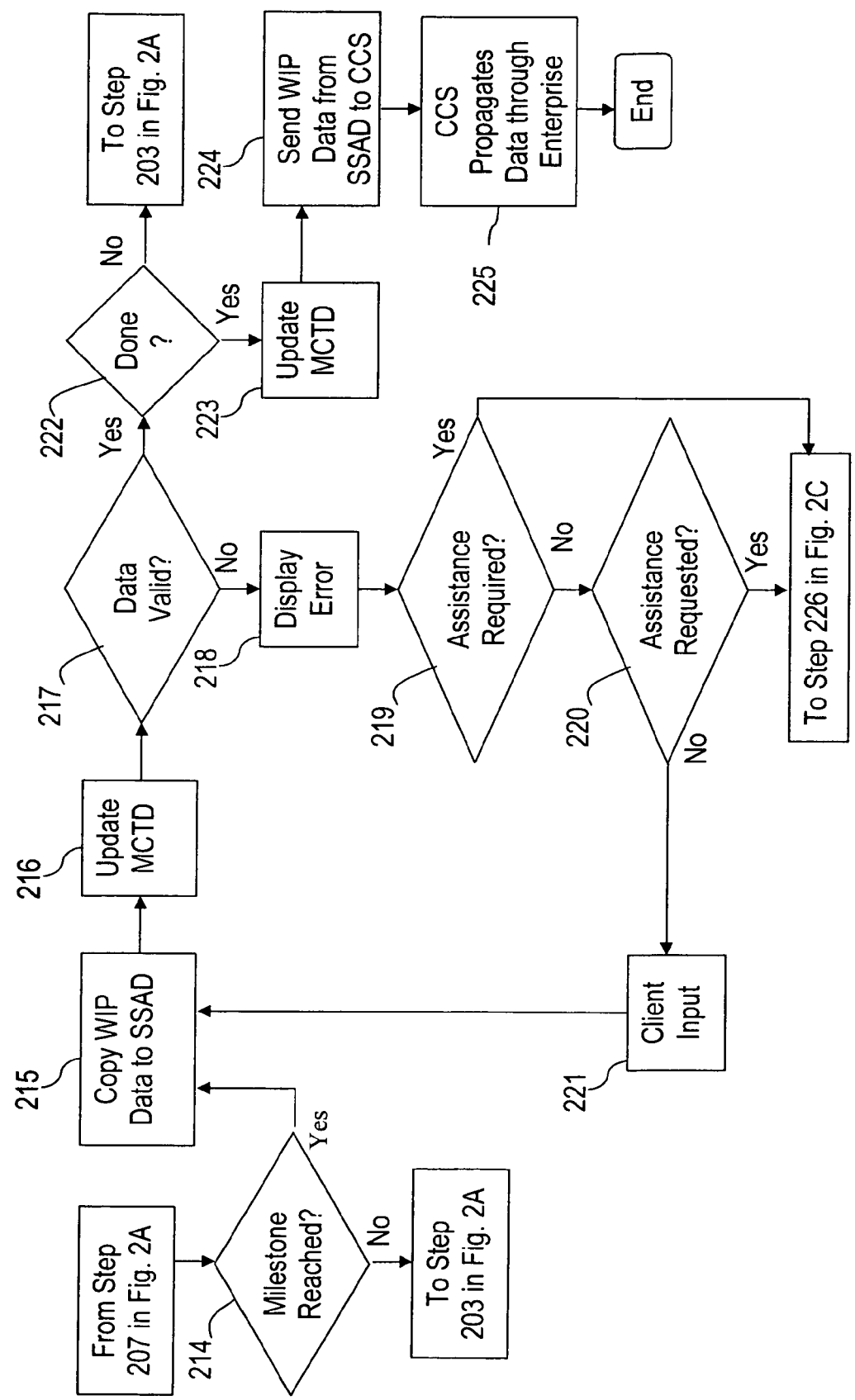
FIG. 2B is an illustrative example of a process for implementing data storage, data validation, and completing the self-service change in service workflow.

In FIG. 2B it is determine in step 214 if a milestone in the workflow has been reached. If a milestone in the workflow has been reached then the WIP data is copied to the SSAD 66 through data communication path 43 and the SSAS 60 in step 215, otherwise the process returns to step 203 in FIG. 2A. The milestone may be set to any step in the workflow. At one extreme the milestone may be set such that the WIP data is copied to the SSAD 66 only upon completion of the entire workflow. This may be disadvantageous if the client needs assistance from a CCR but is unable to transfer data from memory 30 to the CCR desktop 98 due to an error such as a network failure or being outside of a coverage area. At the other extreme the milestone may be set such that the WIP data is copied to the SSAD 66 upon completing each step in the workflow. In a preferred embodiment the milestone may be set at an intermediate step in the workflow, for example, once the client has entered all of their personal data, or once the client has selected the type of service or options in their service which they want to change, etc. Upon copying the WIP data to the SSAD 66 in step 215 the SSAS 60 communicates via the middleware application 70 to the MCTD 80 to update the ongoing customer transaction in step 216.

The process continues on to step 217 where it is determined if the data that has been entered is valid. This may be accomplished by the SSAS 60 communicating the WIP data to various enterprise systems 120 which have error detection for validating client data. Some types of error detection could be address validation, fraud detection, etc. The validity of the data may also be determined based on requirements set by the enterprise systems 120. Some such requirements may be passing a credit check, or making sure a requested phone number isn't already in use, etc. If the data is not determined to be valid in step 217 then the process continues to step 218 to display an error message on the wireless device 10. After displaying the error message checks similar to steps 209-212 of FIG. 2A may be made to determine if a client has encountered too many errors. In step 219, it is determined if assistance is required to complete the CIS workflow based on the nature of the error. For example, if a fraud alert was the reason the data was not determined to be valid then the client may be required to speak to a CCR in order to complete the CIS workflow. If it is determined in step 219 that assistance is not required then in step 220 it is determined if the client requests assistance. If the client does not request assistance then the client may input data in step 221 in order to attempt to correct the error. For example, if a client enters in an address with a four digit street number, the error checking of step 205 won't detect an error. After sending the address data to an address validation system in step 217 it may be determined that the street number is not a valid street number. Upon review of the error the client may realize they missed a digit in their street number and correct the error. After receiving the client input in step 221 the data is again saved in the SSAD 66, updated in the MCTD 80, and communicated to various enterprise systems 120 which have error detection for validating client data and the process for determining data validity is repeated starting at step 217.

If the data has been determined to be valid in step 217 then it is determined in step 222 if all of the steps in the CIS workflow are completed. If not, then the process goes back to step 203 to implement the next step in the workflow. If the workflow was determined to be complete in step 222 then in step 223 the WIP data is saved as transaction data in the MCTD 80 to reflect that the current customer transaction has been completed. In step 224 the WIP data is provided as transaction data to the CCS 90 via the middleware application 70 and in step 225 the CCS 90 propagates the transaction data through all of the necessary enterprise systems 120 to finalize the change in service. For example, in an ESN swap transaction, the CCS 90 notifies the number management system to replace the old ESN associated with the client's phone number with the ESN for the new wireless device.

Looking back to step 205 in FIG. 2A, if an error is detected, an error message is displayed on the wireless device 10 in step 208. In step 209 it is determined if a predetermined number of errors X have occurred either in the same workflow step or throughout the entire workflow progress. For example, if the predetermined number of errors for one step is three and the predetermined number of errors for a workflow is 10, then if a client is currently in a workflow step to enter address data and has already had 3 errors trying to enter the address data, then step 209 would determine that the predetermined number of errors has occurred and move to step 210. Similarly if the client is further along in the workflow and step 209 determines that the client has had a total of 10 errors throughout the current workflow, then step 209 would determine that the predetermined number of errors has occurred and move to step 210. In step 210 a message is displayed to the client that they have encountered too many errors trying to use the CIS workflow and they must contact customer care to complete the change in service transaction. After the message has been displayed the process would proceed to step 226 of FIG. 2C. If, however, it has been determined in step 209 that X number of errors have not occurred then in step 211 it is determined if one less than the predetermined number of errors has occurred. If so then the client is warned in step 212 that if they have another error they will be required to contact customer care to complete the change in service transaction. In step 213, after the error has been displayed in step 208, the client is asked if they would like the assistance of a CCR. If not, then the client may then be directed back to step 204 to enter data for that workflow step in an attempt to correct the error. If the client indicates in step 213 that they do want the assistance of a CCR then the process would proceed to step 226 of FIG. 2C.

Figure 2C:
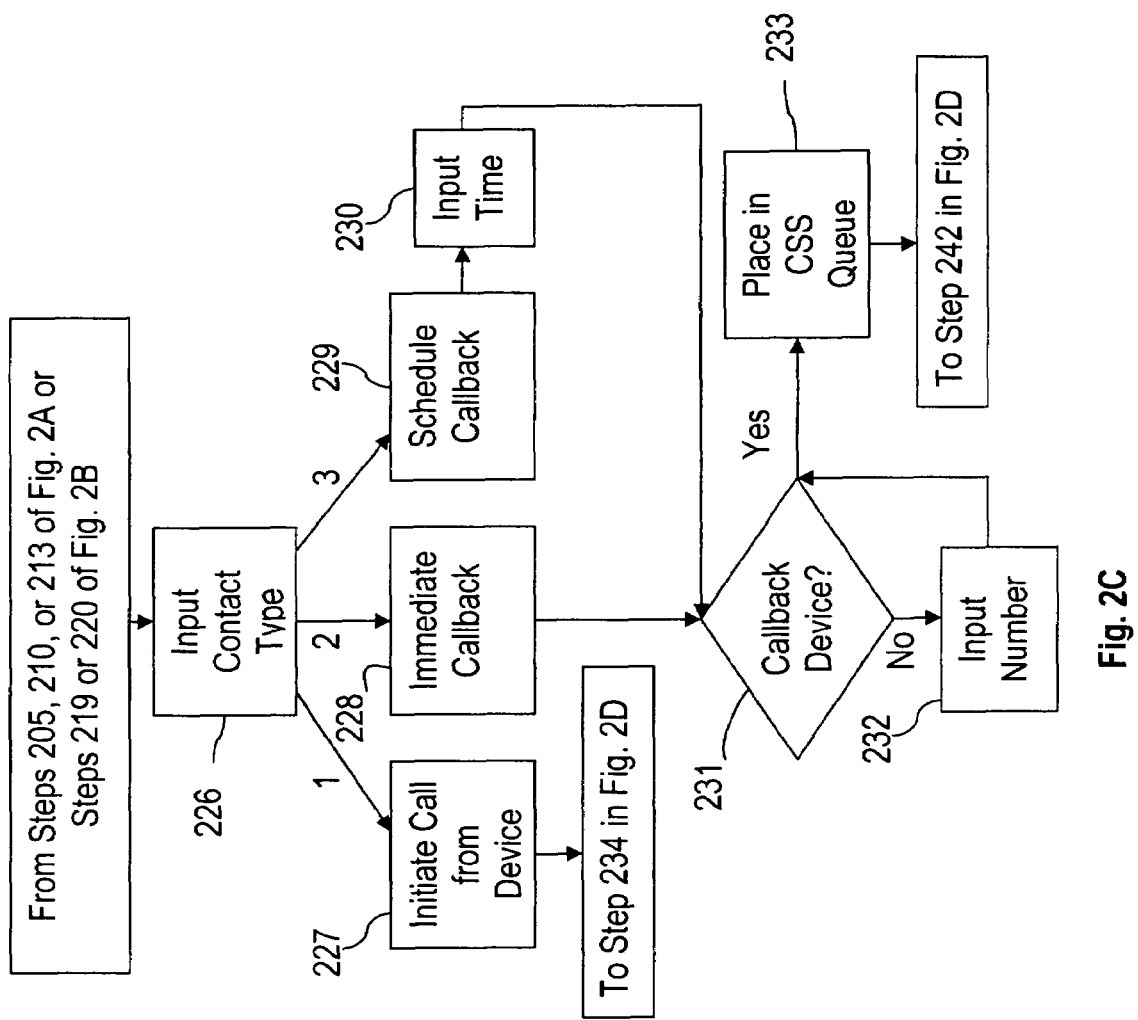
FIG. 2C is an illustrative example of a process for initiating a contact method with customer care.

FIG. 2C continues the process from any of steps 205, 210, or 213 from FIG. 2A or steps 219 or 220 from FIG. 2B. In step 226 a message is displayed to the client indicating a number of choices for contacting customer care. This may be implemented through a customer being prompted to press 1 to initiate a call from the wireless device 10 in step 227, press 2 to have a CCR call back as soon as possible in step 228, or press 3 to schedule a time for a CCR to call back in step 229. If the client pressed 3 to schedule a time for a CCR to call back, then the client would then input a time range for a CCR to call back in step 230. If the client pressed 2 to have a CCR to call back as soon as possible, or after entering a time range in step 230, it is determined in step 231 if the wireless device 10 should be called back. This may be accomplished by determining if the wireless device 10 is capable of receiving calls and if not then the client is prompted to enter a number to call back to in step 232. If it is determined that the wireless device 10 can receive calls, then the client may be prompted whether or not they wish to receive their call back on the wireless device 10 or an alternate number. If the client wants to receive their call back on the wireless device 10 then the process would proceed to step 233, otherwise the client would enter in the number they wished called in step 232. Upon completion of step 232 the process proceeds to step 233. In step 233 the information regarding calling back the customer is placed in a CCS 90 queue to be acted upon in the order in which it was placed in the queue. Note that the CCS 90 queue may be a component of the TMS 96. Also note that if a client scheduled a time to be called back then the information would be placed in the queue such that it wouldn't be acted on until the scheduled time. The process continues on to step 242 in FIG. 2D. If the client pressed 1 in step 226 to initiate a call to customer care from the wireless device 10 in step 227 then the process would proceed to step 234 in FIG. 2D.

Figure 2D:
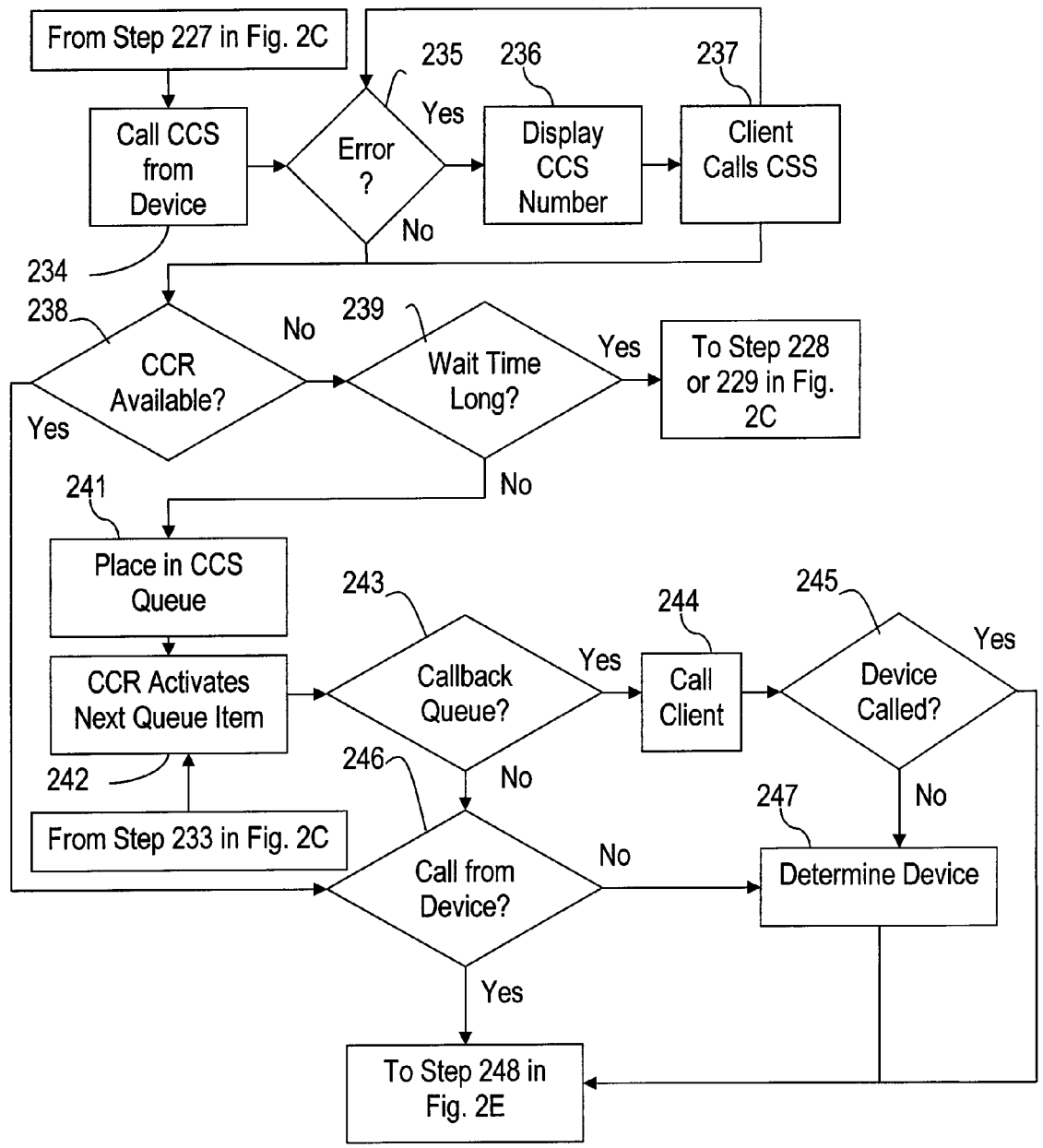
FIG. 2D is an illustrative example of a process for connecting with customer care.

In FIG. 2D the process continues from step 227 with step 234 where a call to customer care is initiated from the wireless device 10. In step 235 it is determined if there were any errors with attempting to make the call from the wireless device 10. Some such errors may be a network failure, the wireless device moving outside of a coverage area, etc. If it has been determined in step 235 that an error occurred then the wireless device may display a message in step 236 describing the nature of the error and a number to call from a working phone to contact customer care. In step 237, the customer can then call customer care from another phone or the client can try to call customer care from the wireless device 10 again. In step 238, after a call successfully has been made to customer care, it is determined whether or not a CCR is available. If a CCR is available then the process moves on to step 246. If not, then step 239 determines how long the wait time is. If the wait time exceeds a predetermined number of minutes then the client may be prompted to press 2 to schedule an immediate callback in step 228 of FIG. 2C or to press 3 to schedule a callback in step 229 of FIG. 2C. This allows for the CCS 90 to reduce the amount of resources being used by having too many clients waiting on hold. If it is determined that the wait time is not too long then in step 241 the client is placed on hold in the CCS 90 queue to be acted upon in the order in which it was placed in the queue.

In step 242 the CCR activates the next queue item in the CCS queue. In step 243 it is determined if the queue item is a callback queue item or a client waiting on hold. If it is determined to be a callback queue item in step 243 then in step 244 the CCR calls back the client at the number specified in the queue item. In step 245 it is determined whether or not the number the CCR is calling is to the wireless device 10 or not. If the call is being made to the wireless device then the process continues on to step 248 in FIG. 2E. If the call is not being made to the wireless device in step 247, once the client and CCR are connected to each other, the identity of the wireless device 10 is determined. This may be accomplished by having the client read off the ESN of the wireless device 10 or some other means known to those skilled in the art. Once the device has been determined in step 247 the process proceeds to step 248 in FIG. 2E. Looking back to step 243, if it is determined that the queue item is a client waiting on hold, then in step 246 it is determined whether or not the call is originating from the wireless device 10. If the call is not originating from wireless device 10, then step 247 is performed as described above. Otherwise, if the call is originating from the device the process proceeds to step 248 in FIG. 2E.

Figure 2E:
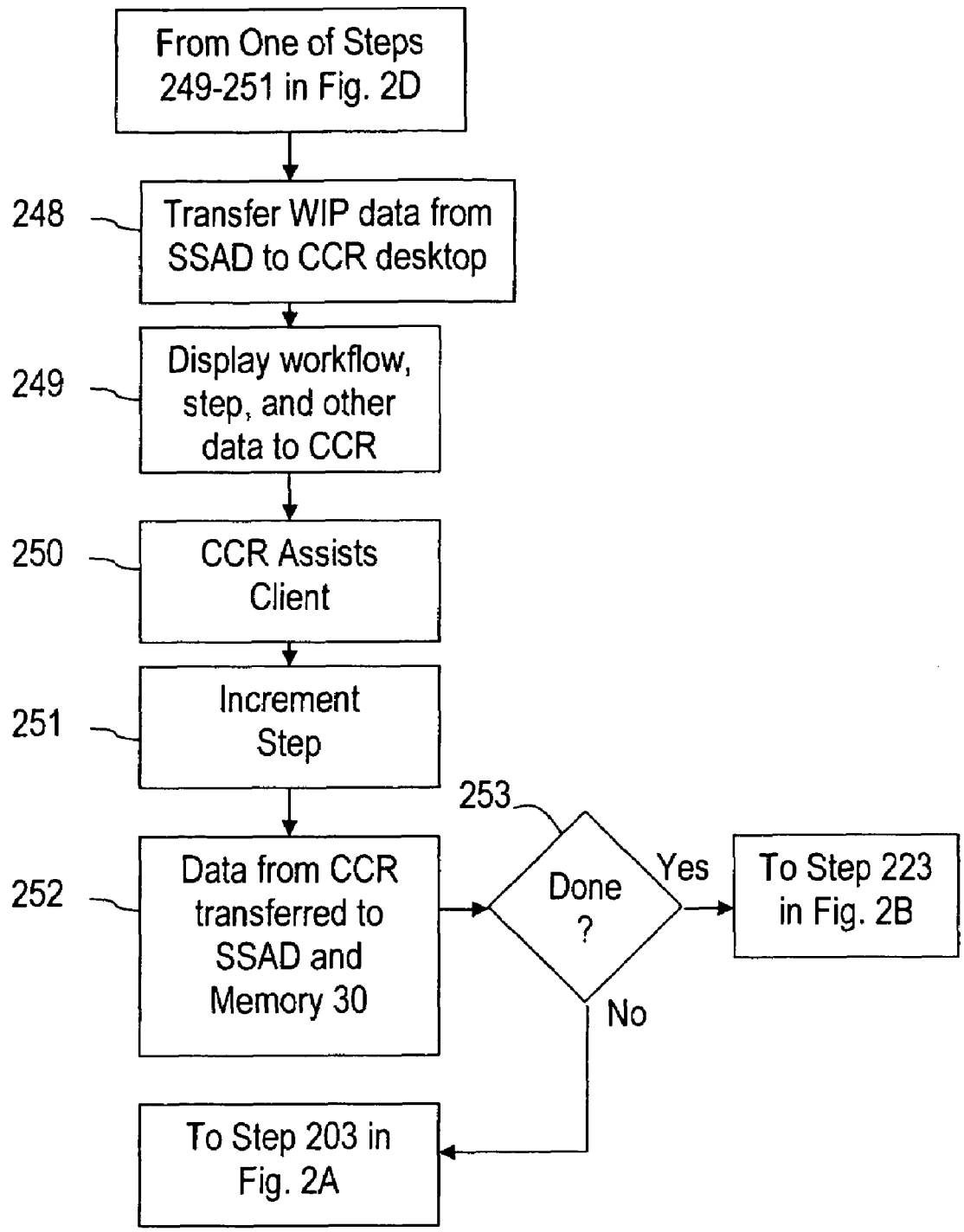
FIG. 2E is an illustrative example of a process for transferring data to and from the customer care system to assist a client with an error in the change in service workflow.

In FIG. 2E the process continues from one of steps 245-247 in FIG. 2D with step 248. In step 248 the WIP data stored in the SSAD 66 is transferred to the CCS 90 via middleware application 70. The CCS 90 then takes the data and transfers it to the desktop 98 of the CCR.

On the CCR desktop 98 is displayed which change in service workflow the client is using, which step in the workflow the client has an error with, and other data that would be useful for the CCR to assist the client in step 249. For example, other data may include a series of steps to go through with the client in order to implement that workflow step properly. In step 250 the CCR then assists the client with whatever error they have. Importantly, the WIP data previously entered by the client is preserved and need not be re-entered by the client. In step 251, once the client has been helped through the workflow step they were having trouble with, the CCR increments the workflow step. In some situations (e.g., if the client has exceeded the maximum number of predetermined errors) the CCR may continue to assist the client to complete the change-in-service process, while in other situations the CCR may transfer control back to the wireless device 10. In step 252, when transferring control back to the wireless device 10, any data collected by the CCR and the current workflow step is updated in the MCTD 80 and the SSAD 66 and the current workflow step is communicated back from the SSAS 60 to the wireless device 10 through the same data communication path 43. It is determined in step 253 if all of the steps in the CIS workflow are completed. If not, the process may then continue on at step 203 in FIG. 2A to implement the current workflow step. If the workflow was determined to be complete in step 253, then the process may proceed to step 223 of FIG. 2B.

It is noted that many variations of the above describe process may be known to those skilled in the art. Various process paths may therefore be added to or deleted from the process described above according to the design choices of the enterprise implementing the above described process and depending upon the type of wireless device. Some examples of such additional process paths are shown in FIGS. 3 and 4.

Figure 3:
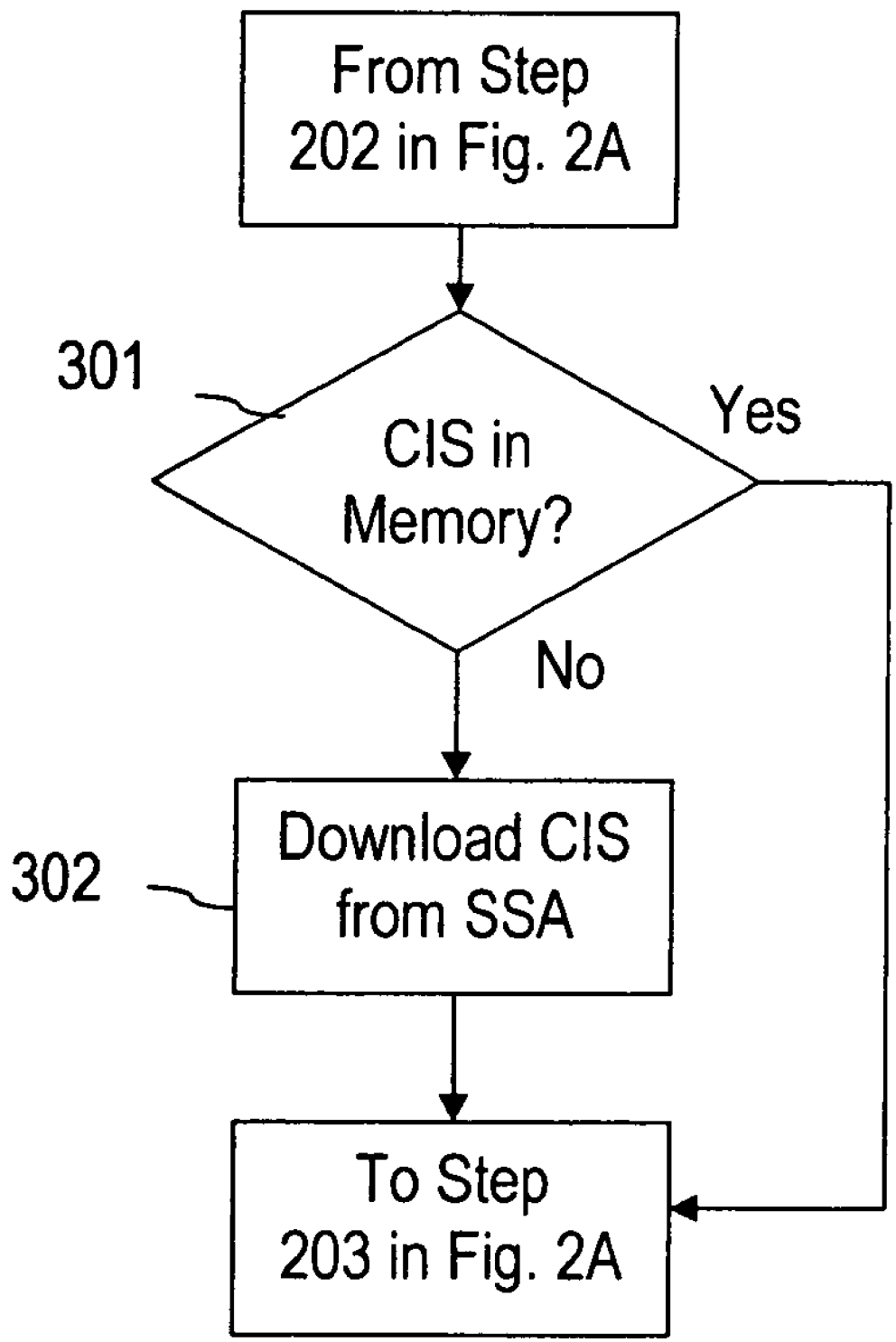
FIG. 3 is an alternative step in the process of FIG. 2A to ensure the change in service workflow is on the wireless device.

In FIG. 3 is an additional process path that may occur between steps 202 and 203 of FIG. 2A. In the above described process it was assumed that any change in service workflow the client would want to implement would be resident on the wireless device 10. In this alternative process path it is determined in step 301 if the CIS workflow selected by the client is resident on the wireless device 10. If it is then the process continues on to step 203 of FIG. 2A as before. If it is, determined in step 301 that the CIS workflow selected by the client is not resident on the wireless device 10, then the wireless device may communicate with the SSAS 60 to download the selected CIS workflow in step 302. This would allow for less memory to be used up on the wireless device 10 to store the CIS workflows.

Figure 4:
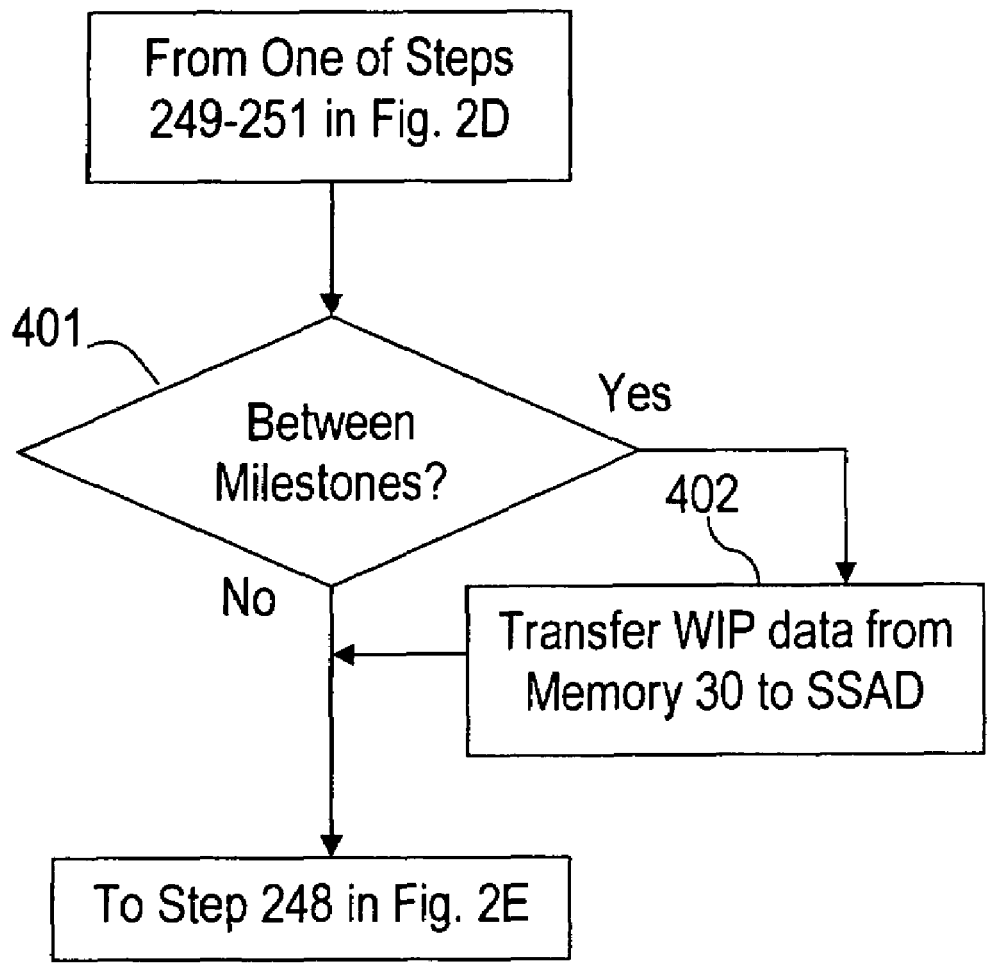
FIG. 4 is an alternative process in the process of FIG. 2E to ensure WIP data collected between milestones is transferred to the CCR.

In FIG. 4 is an additional process path that may occur just prior to step 248 in FIG. 2E. In the above described process the WIP data is transferred to the SSAD 66 upon the completion of milestones in the workflow. If workflow steps are successfully completed between each milestone, then that data is not transferred to the SSAD 66 until the next milestone is reached. As such, if a customer encounters an error then the data transferred from the SSAD 66 to the CCR desktop 98 is not the most current WIP data and some workflow steps may have to be repeated with the CCR. In this alternative process path it is determined in step 401 if the workflow is at a step between milestones. If so, then any WIP data entered by the client and stored on memory 30 since the last milestone is transferred to the SSAD 66 in step 402 and the process continues on to step 248 of FIG. 2E. If the workflow is not between milestones, meaning that the last step successfully completed was at a milestone, then the process continues on to step 248 of FIG. 2E as before.

The overall process described above enables a client to use a self-service application to implement a change in service workflow on a wireless device 10. If a client has one or multiple errors on a single CIS workflow step or multiple errors throughout the workflow then the client may contact a customer care representative for assistance. Upon contacting the customer care representative, the data collected through the change in service workflow and data indicating the current workflow step is transferred to the customer care representative from the SSAD 66 to be displayed on the customer care representative's desktop 98. Upon the customer care representative successfully assisting the client the workflow step is incremented and any data collected by the CCR and the current workflow step may be transferred back to the SSAD 66 and memory 30 on the wireless device 10 to enable the wireless device to continue the self service application.

In the above described processes the data is only sent to the CCS 90 to be propagated to the necessary enterprise systems only upon completion of the entire workflow. It may be desirable to propagate the data to the necessary enterprise systems upon the completion of a milestone in the workflow in order to enable synchronization across the enterprise and the wireless device 10. As such, an alternative process is described below with reference to FIG. 5.

Figure 5:
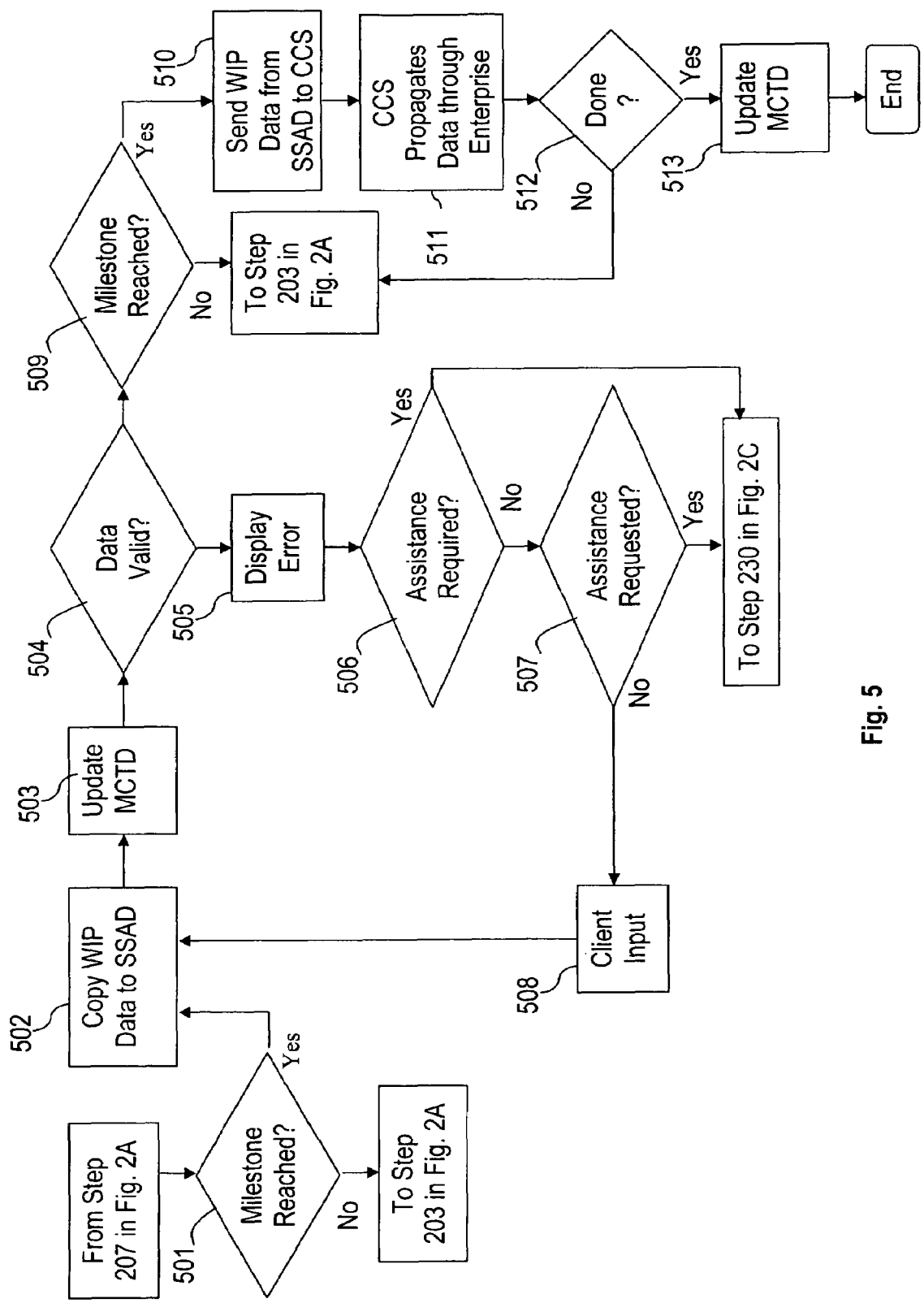
FIG. 5 is an illustrative example of an alternative process to implement data storage, data validation, and completing the self-service change in service workflow.

The process of FIG. 5 replaces steps 222-225 of FIG. 2B with steps 509-513. In step 509 it is determined if a milestone in the workflow has been reached. This milestone may be at any step in the workflow progress and may or may not be at the same workflow step as the milestone of step 501. For example, in step 501 a determination of a small milestone, such as the completion of entering all of the address data, may be made and in step 509 a determination of a large milestone, such as the completion of entering all of the personal information data, may be made. In step 510 the WIP data is sent to the CCS 90 which propagates the data through the enterprise systems 120 in step 511. In step 512 it is determined if the CIS workflow has been completed. If so, then the process continues to step 513 where the WIP data is saved as transaction data in the MCTD 80 to reflect that the current customer transaction has been completed. If not, then the process goes back to step 203 of FIG. 2A to implement the next step in the CIS workflow.

The overall process of the above described alternative process enables a client to use a self-service application to implement a change in service workflow on a wireless device 10. Upon reaching a milestone in the workflow the data and current workflow step is copied to the SSAD 66 and upon reaching a milestone the data is again copied to the CCS 90 and propagated across the necessary enterprise system(s) 120. When encountering an error, upon contacting the customer care representative the data collected through the change in service workflow and data indicating the current workflow step is transferred to the customer care representative from the SSAD 66 to be displayed on the customer care representative's desktop 98. Upon the customer care representative successfully assisting the client the workflow step is incremented and any data collected by the CCR and the current workflow step may be transferred back to the SSAD 66 and memory 30 on the wireless device 10 to enable the wireless device to continue the self service application.

Figure 6:
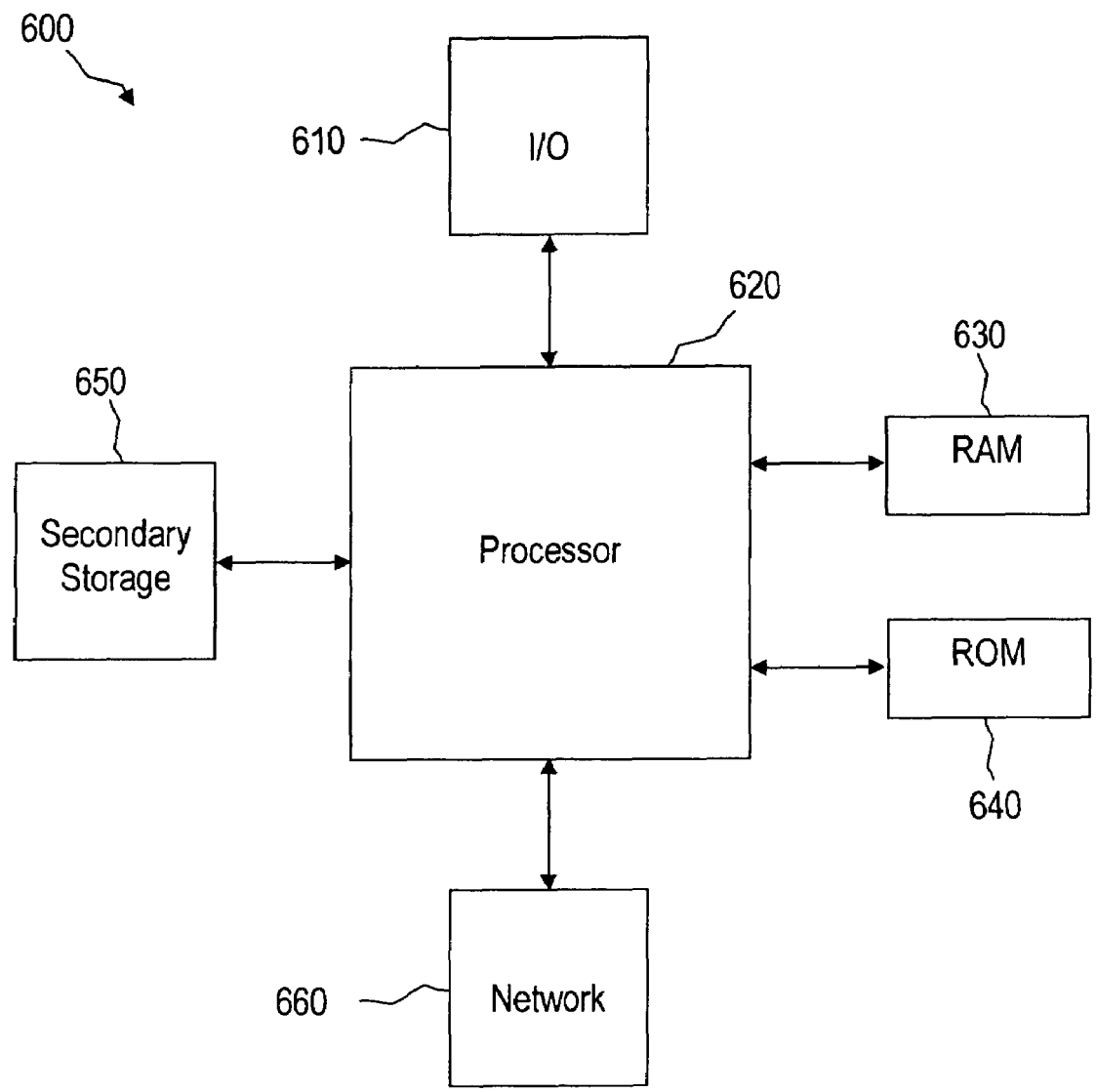
FIG. 6 is an illustrative example of a general-purpose computer configurable to implement at least some of the disclosed systems and methods.

The systems and methods described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 600 includes a processor 620 (which may be referred to as a central processor unit or CPU) that is in communication with memory devices including secondary storage 650, read only memory (ROM) 640, random access memory (RAM) 630, input/output (I/O) devices 610, and network connectivity devices 660. The processor may be implemented as one or more CPU chips.

The secondary storage 650 is typically comprised of one or more disk drives or tape drives and is used for non-volatile storage of data and as an over-flow data storage device if RAM 630 is not large enough to hold all working data. Secondary storage 650 may be used to store programs which are loaded into RAM 630 when such programs are selected for execution. The ROM 640 is used to store instructions and perhaps data which are read during program execution. ROM 640 is a non-volatile memory device which typically has a small memory capacity relative to the larger memory capacity of secondary storage 650. The RAM 630 is used to store volatile data and perhaps to store instructions. Access to both ROM 640 and RAM 630 is typically faster than to secondary storage 650.

I/O devices 610 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 660 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 660 may enable the processor 620 to communicate with an Internet or one or more intranets. With such a network connection, it is contemplated that the processor 620 might receive information from the network, or might output information to the network in the course of performing the above-described method steps. Such information, which is often represented as a sequence of instructions to be executed using processor 620, may be received from and outputted to the network, for example, in the form of a computer data signal embodied in a carrier wave.

Such information, which may include data or instructions to be executed using processor 620 for example, may be received from and outputted to the network, for example, in the form of a computer data baseband signal or signal embodied in a carrier wave. The baseband signal or signal embodied in the carrier wave generated by the network connectivity devices 660 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 620 executes instructions, codes, computer programs, scripts which it accesses from hard disk, floppy disk, optical disk (these various disk based systems may all be considered secondary storage 650), ROM 640, RAM 630, or the network connectivity devices 660.

The foregoing description discloses systems and methods for transferring data collected through a self-service application to and from a customer care system. The system and processes allow for a client to receive assistance from a customer care representative without having to repeat steps and information in a change in service workflow. It should be noted that the foregoing description discloses illustrative embodiments for a clear understanding of the principles of the invention. Many variations and modifications may be made to the above-described embodiments without departing substantially from the spirit and principles of the invention. For example, the foregoing processes can be implemented as a computer-readable storage medium containing a set of instructions for implementing the processes described above. All such modifications and variations are intended to be included herein within the scope of the present invention as defined by the following claims.

What is claimed is:

1. A system that enables customer care assistance with self service transactions, the system comprising:
a self-service application provided to a wireless device, the self-service application executable on the wireless device to perform a plurality of steps of a self-service transaction workflow;
a self-service application server comprising a processor configured to interact with the self-service application, the self-service application server tracks a current workflow state that identifies one of the plurality of steps, and the self-service application server receives work-in-progress data entered by a user of the wireless device and stored on the wireless device during execution of the plurality of steps; and
a customer care system coupled to the self-service application server, the customer care system comprising a processor configured to allow the customer care system to obtain the current workflow state and the work-in-progress data from the self-service application server when connecting a customer care representative to the user;
wherein the customer care system is configured to perform a step of the self-service transaction workflow after connecting the customer care representative to the user and wherein the self-service application on the wireless device resumes performance of the self-service transaction workflow after the customer care system performs the step of the self-service transaction workflow.

2. The system of claim 1, wherein the customer care system is configured to update the current workflow state and the work-in-progress data in response to inputs from the customer care representative.

3. The system of claim 2, wherein the customer care system is further configured to provide an updated workflow state and updated work-in-progress data to the self-service application server.

4. The system of claim 3, wherein the self-service application server is configured to resume interacting with the self-service application on the wireless device after receiving the updated workflow state and updated work-in-progress data from the customer care system.

5. The system of claim 1, wherein the workflow implements one or more self-service transactions from a group comprising device activation, account/subscription maintenance, an electronic serial number (ESN) swap, a mobile directory number (MDN) swap, or a carrier serving area (CSA) swap.

6. The system of claim 1, further comprising:
a group of enterprise systems coupled to the customer care system to receive data corresponding to each system so as to complete the workflow.

7. The system of claim 6, wherein the group of enterprise systems receives the data corresponding to each system at the completion of the workflow or work-in-progress data at the completion of each workflow state.

8. The system of claim 1, further comprising:
a data validation system coupled to the wireless device or the self-service application server to obtain the work-in-progress data at the completion of a workflow state or a milestone in the workflow.

9. The system of claim 8, wherein the data validation system is configured to perform data validation through one or more of a group comprising of data format, address validation, fraud detection, credit check, or number availability.

10. The system of claim 1, further comprising:
a master customer transaction database coupled to the self-service application server and the customer care system to obtain the current workflow state and the work-in-progress data so as to track customer transactions within the customer care system.

11. A system that enables customer care assistance with self service transactions, the system comprising:
a wireless device that enables a user to perform one or more self-service transactions from a group consisting of device activation, account/subscription maintenance, an ESN swap, an MDN swap, or a CSA swap, wherein the wireless device comprises a processor configured to execute a plurality of steps for each of the one or more self-service transactions and a memory that stores a current transaction state that identifies one of the plurality of steps for a self-service transaction and work-in-progress data entered for the self-service transaction when the self-service transaction is performed;
a self-service application server comprising a processor configured to interact with the wireless device to track a current workflow state that identifies one of the plurality of steps and to receive the work-in-progress data entered into the wireless device; and
a customer care system configured to receive the current transaction state and the work-in-progress data from the self-service application server when connecting a customer care representative to the user;
wherein the customer care system is configured to update the current transaction state and the work-in-progress data in response to inputs from the customer care representative and to provide an updated workflow state and updated work-in-progress data to the wireless device through the self-service application server; and
wherein the wireless device is configured to resume the self-service transaction after receiving the updated workflow state and updated work-in-progress data from the self-service application server.

12. The system of claim 11, further comprising:
a group of enterprise systems coupled to the customer care system to receive data corresponding to each system so as to complete the self-service transaction, wherein the group of enterprise systems receives transaction data at the completion of the self-service transaction or work-in-progress data at the completion of each transaction state.

13. The system of claim 11, further comprising:
a data validation system coupled to the wireless device or the self-service application server to obtain the work-in-progress data at the completion of a transaction state or a milestone in the self-service transaction, wherein
the data validation system is configured to perform data validation through one or more of a group comprising of data format, address validation, fraud detection, credit check, or number availability.

14. The system of claim 11, further comprising:
a master customer transaction database coupled to the self-service application server and the customer care system to obtain the current transaction state and the work-in-progress data so as to track customer transactions within the customer care system.

15. A method of providing customer care assistance for self-service transactions on a wireless device, the method comprising:
providing a self-service application to the wireless device for execution of a workflow for a self-service transaction on the wireless device;
receiving a request for customer care assistance with the workflow of the self-service transaction executing on the wireless device;
obtaining a current workflow state of the workflow that identifies a current one of a plurality of steps in the workflow and work-in-progress data of the self-service transaction stored on the wireless device;
providing the current workflow state of the workflow that identifies a current one of a plurality of steps in the workflow and the work-in-progress data of the self-service transaction from the wireless device to a self-service application server;
providing the current workflow state of the workflow that identifies a current one of a plurality of steps in the workflow and the work-in-progress data of the self-service transaction from the self-service application server to a customer care system;
updating the current workflow state and the work-in-progress data in response to input from a customer care representative using the customer care system; and
providing the updated workflow state and the updated work-in-progress data to the wireless device for continuing the self-service transaction on the wireless device.

16. The method of claim 15, wherein the wireless device carries out a remainder of the self-service transaction workflow beginning from the updated workflow state.

\* \* \* \* \*